Figure 1:
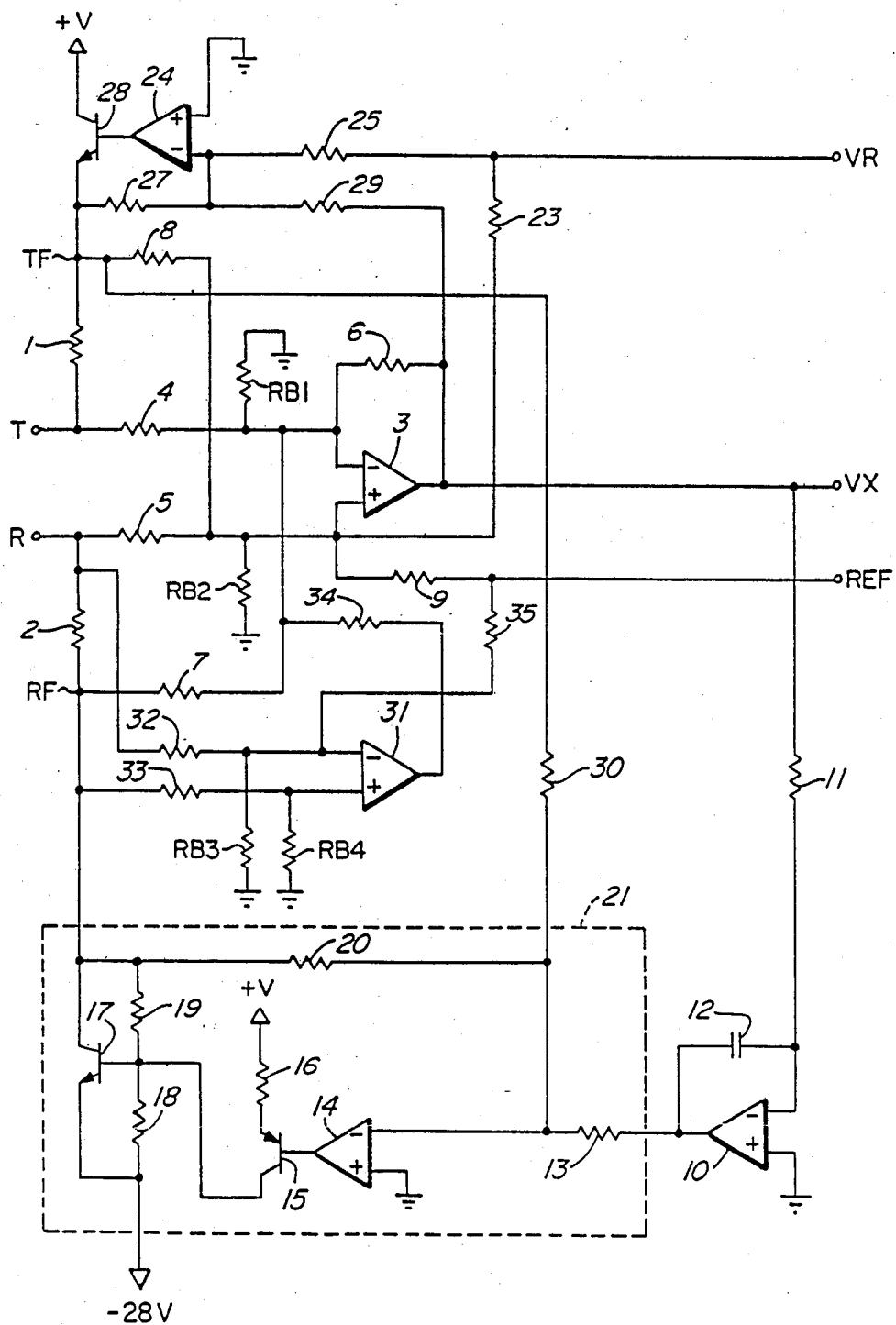

United States Patent [19]
Meier et al.

[11] Patent Number: 4,723,280
[45] Date of Patent: Feb. 2, 1988

[54] CONSTANT CURRENT LINE CIRCUIT

[75] Inventors: Rolf G. Meier, Nepean; John A. Barsellotti, Kanata, both of Canada

[73] Assignee: Mitel Corporation, Kanata, Canada

[21] Appl. No.: 747,705

[22] Filed: Jun. 24, 1985

[30] Foreign Application Priority Data

Mar. 15, 1985 [CA] Canada ............................ 476683

[51] Int. Cl.$^4$ .................................. H04M 19/00
[52] U.S. Cl. ................................ 379/413; 379/405
[58] Field of Search .......... 179/16 AA, 16 F, 18 FA, 179/70, 77, 170 NC, 170 R; 379/322, 398, 324, 348, 413, 405, 402, 401, 400, 399

[56] References Cited

U.S. PATENT DOCUMENTS

| | | | |
|---|---|---|---|
| 4,086,447 | 4/1978 | Schindler et al. | 379/405 |
| 4,178,485 | 12/1979 | Cowpland et al. | 379/382 |
| 4,203,009 | 5/1980 | Tattersall | 379/399 |
| 4,278,847 | 7/1981 | Wortman | 379/405 |
| 4,472,608 | 9/1984 | Beirne | 379/399 |
| 4,532,381 | 7/1985 | Rosenbaum et al. | 379/405 X |
| 4,540,854 | 9/1985 | Beirne | 379/345 |
| 4,563,547 | 1/1986 | Booth | 379/342 |
| 4,600,811 | 7/1986 | Hayashi et al. | 379/345 |
| 4,604,741 | 8/1986 | Barsellotti | 379/400 X |

FOREIGN PATENT DOCUMENTS 2093314 8/1982 United Kingdom .
2102249 1/1983 United Kingdom .

*Primary Examiner*—Thomas W. Brown
*Assistant Examiner*—R. Vaas
*Attorney, Agent, or Firm*—Alan H. Levine

[57] ABSTRACT

A constant current line circuit for connection to balanced tip and ring leads of a telephone line and unbalanced transmit and receive leads of a PABX. A differential amplifier receives and applies incoming audio signals carried by the tip and ring leads to the unbalanced transmit lead, and detects D.C. loop current flowing through the tip and ring leads and generates a D.C. signal in response thereto. A voltage controlled feed current supply, connected in a circuit to the differential amplifier, generates a constant current D.C. voltage to the tip and ring leads in response to receiving the D.C. signal, and an integrator circuit is connected in a feedback path from the output of the differential amplifier to a voltage control input of the supply, for filtering audio signals received by the differential amplifier and regulating the generated D.C. signal to a quiescent value of approximately zero volts. The line circuit provides simultaneous bidirectional signal translation and constant D.C. feed current generation in response to detecting the D.C. loop current and generating and regulating the D.C. signal.

20 Claims, 1 Drawing Figure

CONSTANT CURRENT LINE CIRCUIT

The present invention relates to telephone line circuits, and more particularly to a line circuit for bidirectionally translating audio signals and regulating feed current supply to a subscriber's line.

Modern day PABXs normally supply operating power to subscribers' lines at typically −48 volts, applied to tip and ring leads of the lines. Various ones of the subscribers' lines or subscriber loops typically have different resistances, depending on the length of the loop. Hence, the current drawn by a long subscriber loop is substantially less than that drawn by a short loop.

Prior art line circuits typically did not compensate for different loop lengths and usually provided a constant voltage battery feed to the tip and ring leads. A minimum loop current of approximately 20 mA is typically required to be provided to a subscriber's loop in order to operate a telephone set connected thereto. Hence, for long loops, large voltages were required in order to generate the minimum 20 mA current. However, in the event the subscriber's loop is short, considerable power was wasted as a result of driving the line with unnecessarily high voltages (eg. −48 volts, −96 volts, etc.).

The problem of prior art line circuit power regulation is exemplified by the well known transformer hybrid which includes a large magnetic core for passing D.C. feed current to the loop. The core was made large in order that it would not saturate in the presence of large D.C. feed currents. The prior art transformer hybrid was bulky and expensive, and thus did not conform to miniaturization requirements of modern day PABXs.

A number of other prior art circuits have been directed at solving the problem of regulating operating power supplied to subscriber loops of various lengths.

One such prior art circuit is described in UK patent application GB No. 2 065 418 published June 24 1981. According to the UK application, a circuit is described for detecting the line current in a subscriber's line and generating a D.C. voltage proportional to the line length for controlling a variable voltage power supply. The variable voltage supply is comprised of a complex switching power supply circuit arrangement which generates D.C. feed current in response to the D.C. voltage applied thereto. The generated feed current is fed to the subscriber's line through large core transformer coils in a similar manner as in the above-mentioned transformer hybrid and hence suffers from the disadvantage that the transformer core is required to be large in order that it does not saturate in the presence of large D.C. currents.

Another prior art line circuit is described in Canadian patent No. 1,157,175 granted to MITEL CORPORATION and issued on Nov. 15, 1983. In operation, the prior art Mitel circuit detects operating current drawn from a high voltage power source by the subscriber's line above a predetermined threshold and connects a lower voltage power source to the line in response thereto, thus reducing the current drawn by the line. In the event the detected current drawn by the line drops below a second lower threshold, the high voltage power source is reconnected.

Because the Mitel device switches between two discrete power supply voltages, power supplied to the line is wasted in the event the line length is short, but not sufficiently short to draw current above the first predetermined threshold.

Neither of the prior art circuits described in either the UK patent application or the Canadian Mitel patent pertains to audio signal transmission to and from the subscriber's line. Hence, in the prior art circuits, additional circuitry was required to implement such audio signal transmission.

The present invention utilizes a differential amplifier for transmitting audio signals to and from a subscriber's loop as well as detecting the amount of feed current flowing in the loop. The differential amplifier compares the detected feed current to a threshold value (for establishing the aforementioned constant current), and generates a D.C. voltage signal which varies in amplitude in response to variations in the amount of feed current flowing in the loop, resulting from variations in loop resistance, etc. The D.C. signal is passed through an integrator circuit in order to remove audio signal components therefrom and is applied to a voltage controlled D.C. power supply for increasing or decreasing feed voltage applied to the loop in response to a decrease or increase respectively in the feed current flowing in the loop in order to maintain constant feed current. The D.C. signal generated by the differential amplifier is regulated by the integrator circuit to a quiescent value of approximately zero volts, such that audio signals received from the subscriber's loop can be applied directly to an unbalanced transmit lead connected to the PABX, without requiring separate D.C. blocking signal translation circuitry.

Thus, the line circuit of the present invention can drive various subscriber loops of different lengths yet automatically adjusts the applied D.C. feed voltage for each in order to maintain constant feed current.

In order to further reduce power consumption, the power supply voltage is limited to a maximum value of approximately −28 volts and is applied to the subscriber's loop through small valued feed resistors.

In order to maintain proper A.C. impedance matching, a portion of the audio signal received from the subscriber's loop is fed back in aiding phase to the loop via the feed resistors. An apparent matching impedance for A.C. signals is thus provided which is larger than that provided by the resistance of the feed resistors alone.

In general, the invention is a constant current line circuit for connection to balanced tip and ring leads and unbalanced transmit and receive leads, comprising a first circuit for generating and applying D.C. feed voltage to the balanced tip and ring leads for causing feed current to flow therethrough, a second circuit for transmitting incoming audio signals carried by the balanced leads to the unbalanced transmit lead and detecting and comparing the aforementioned feed current flowing through the balanced tip and ring leads to a predetermined threshold signal and generating a D.C. signal in response thereto, and a third circuit for transmitting outgoing audio signals carried by the unbalanced receive lead to the balanced tip and ring leads. The invention is further comprised of a fifth circuit connected to the first and second circuits for detecting level changes in the D.C. signal and varying the generated feed voltage in response thereto, thereby maintaining constant feed current. The audio signals are thus bidirectionally translated between the balanced and unbalanced leads simultaneously with the constant feed current being provided to the balanced tip and ring leads.

More particularly, the invention is a constant current line circuit for connection to balanced tip and ring leads and unbalanced transmit and receive leads, comprising an amplifier for differentially receiving incoming audio signals carried by the tip and ring leads, sensing D.C. loop current flowing through the tip and ring leads and generating and applying a modulated D.C. signal to the transmit lead in response thereto, a first circuit connected between the amplifier and the supply circuit, for filtering and regulating the modulated D.C. signal to a quiescent amplitude of approximately zero volts, a supply circuit connected to the first circuit, for receiving the filtered D.C. signal and applying a constant current D.C. voltage to the tip and ring leads in response thereto, and a second circuit for receiving outgoing audio signals from the receive lead and differentially applying the received outgoing signals to the tip and ring leads, whereby audio signals are bidirectionally translated between the balanced and unbalanced leads, and constant current is simultaneously provided to the balanced tip and ring leads.

More particularly, the invention is a constant current line circuit for connection to balanced tip and ring leads and unbalanced transmit and receive leads, comprising tip and ring terminals for connection to the balanced tip and ring leads, a first differential amplifier connected to the tip and ring terminals and the unbalanced transmit lead, for translating incoming audio signals carried by the tip and ring terminals to the transmit lead, and sensing D.C. loop current flowing through the tip and ring leads and generating a D.C. signal in response thereto, an integrator circuit connected to an output of the first differential amplifier, for filtering the incoming audio signals and regulating the D.C. signal to a quiescent value of approximately zero volts. In addition, the invention is comprised of a level shifting circuit connected to an output of the integrator circuit, for generating and applying the D.C. loop current to the tip and ring terminals in response to receiving the regulated D.C. signal from the integrated circuit, a second differential amplifier having an input connected to the unbalanced receive lead and an output connected in a circuit to the tip and ring terminals, for receiving outgoing signals carried by the receive lead and differentially applying the received signals to the tip and ring terminals, and a circuit for cancelling the outgoing signals carried by the receive lead from being applied to the transmit lead, whereby audio signals are bidirectionally translated between the balanced and unbalanced leads and constant D.C. loop current is simultaneously supplied to the balanced tip and ring leads in response to the first differential amplifier sensing the D.C. loop current flowing therethrough.

A better understanding of the invention will be obtained by reference to the description below, in conjunction with the following drawing in which:

FIG. 1 is a schematic diagram of a preferred embodiment of the invention.

With reference to FIG. 1, tip and ring terminals T and R, are shown connected to feed resistors 1 and 2. The tip and ring terminals T and R are also typically connected to tip and ring leads of a subscriber's loop connected to a remote telephone set. Inverting and non-inverting inputs of a differential amplifier 3 are connected to tip and ring terminals T and R, via input resistors 4 and 5, respectively, and to ground via balancing resistors RB1 and RB2 respectively. An output of differential amplifier 3 is connected to the inverting input thereof via a feedback resistor 6.

The inverting and non-inverting inputs of differential amplifier 3 are also connected in respective circuit paths to feed resistors 2 and 1 via current sense resistors 7 and 8 respectively. The non-inverting input of amplifier 3 is connected to a source of reference voltage REF, via resistor 9.

The output of differential amplifier 3 is connected to an inverting input of a differential amplifier 10 via a resistor 11. The non-inverting input of differential amplifier 10 is connected to ground and the output is connected to the inverting input thereof via capacitor 12. Differential amplifier 10 is thus configured as an integrator circuit, in a well known manner.

The output of differential amplifier 10 is a also connected via resistor 13, to an inverting input of a differential amplifier 14. A non-inverting input of differential amplifier 14 is connected to ground. An output of differential amplifier 14 is connected to a base input of PNP transistor 15, an emitter terminal of which is connected via pull-up resistor 16 to a voltage source +V of preferably 5 volts. A collector terminal of transistor 15 is connected to a base terminal of NPN transistor 17. The base terminal of transistor 17 is connected in a circuit to an emitter terminal thereof and to a source of battery voltage, −28 V, via resistor 18. A collector terminal of transistor 17 is connected in a circuit to the base terminal thereof via resistor 19 and to the inverting input of differential amplifier 14 via feedback resistor 20.

Differential amplifier 14, transistors 15 and 17, and resistors 13, 16, 18, 19 and 20 comprise a level shifting circuit, denoted by the dashed block 21. Level shifting circuit 21 is of a variety known in the art as an auto-nulling circuit. Level shifting circuit 21 generates and applies a predetermined voltage to the ring feed point RF in order that the output voltage from differential amplifier 10 remains at a quiescent amplitude of approximately zero volts, as described in detail below.

The collector terminal of transistor 17 is connected to a node designated as the ring feed point RF connecting feed resistor 2 and current sense resistor 7.

The output of differential amplifier 3 is connected also to a transmit audio signal terminal VX.

A receive audio signal terminal VR is connected to the non-inverting input of amplifier 3 via a resistor 23, and to an inverting input of a differential amplifier 24 via input resistor 25. A non-inverting input of differential amplifier 24 is connected to ground. An output of differential amplifier 24 is connected to a base terminal of an NPN transistor 28. The inverting input of amplifier 24 is also connected to the output of differential amplifier 3 via a resistor 29.

A collector terminal of transistor 28 is connected to the voltage source +V, and an emitter terminal thereof is connected to a resistor 27, and to the node connecting feed resistor 1 and current sense resistor 8 (designated as the tip feed point, TF). The tip feed point TF is also connected to feedback resistor 20 of the threshold shifting circuit 21 via a resistor 30.

The resistances of resistors 25, 27 and 29 establish the gain of amplifier 24.

A differential amplifier 31 is shown having an inverting input thereof connected to the ring terminal R via an input resistor 32, and a non-inverting input connected to ring feed point RF via an input resistor 33. The inverting and non-inverting inputs of amplifier 31 are also connected to ground via balancing resistors RB3 and RB4, respectively. An output of differential amplifier 31 is connected to the inverting input of differential amplifier 3 via a resistor 34, and the inverting input of differential amplifier 31 is connected to the REF terminal via resistor 35. The resistance of balancing resistor RB4 is preferably made equal to the resistance of the parallel combination of resistors 35 and RB3, in order to ensure proper longitudinal balance.

Considering operation of the circuit for providing constant feed current, differential amplifier 3 senses the current flowing through feed resistor 2 by detecting the voltage thereacross via approximately equal valued input resistors 5 and 7, and the voltage across feed resistor 1 is detected via approximately equal valued input resistors 4 and 8. In a successful prototype of the invention, resistors 4, 5, 7 and 8 were each approximately 80k ohms. The voltages across feed resistors 1 and 2 are summed in differential amplifier 3 and compared therein with a reference voltage (e.g. generated by the PABX to which this line circuit is intended to be connected) applied to the REF terminal via resistor 9.

In the event of a sudden change in loop current, (i.e. due to the telephone set in the subscriber's loop going off-hook), differential amplifier 3 generates a D.C. voltage resulting from the comparison between the sensed loop current and the desired loop current (as determined by the reference voltage applied to the REF terminal). The D.C. voltage is applied to level shifting circuit 21, via the integrator circuit, for varying the voltage applied to the ring terminal via feed resistor 2 and thereby providing a constant current feed at the desired current. The output voltage of level shifting circuit 21 is continually varied in accordance with the amplitude of the D.C. voltage applied thereto, until a quiescent amplitude of zero volts is generated by differential amplifier 3, indicating a constant current feed equal to the desired constant loop current.

Differential amplifier 10 in conjunction with capacitor 12 and resistor 11 comprises the aforementioned integrator circuit for removing A.C. audio signal components on the tip and ring leads and received by differential amplifier 3. Because the non-inverting input of differential amplifier 10 is connected to ground, the D.C. voltage on the inverting input thereof is drawn toward zero volts. Hence, the output voltage of differential amplifier 3 is regulated to a quiescent value of approximately zero volts.

Resistor 11 in conjunction with capacitor 12 establishes the settling time required for reaching the aforementioned quiescent amplitude of zero volts in response to a change in loop current, which in the successful prototype of the invention was approximately 30 msec.

The voltage output from differential amplifier 10 is received by amplifier 14, which in response drives the base terminal of PNP transistor 15. As the voltage applied to the base terminal changes, the collector current flowing in transistor 15 varies in response. The collector voltage of transistor 15 is approximately 0.7 volts higher than −28 volts (the base-emitter voltage of transistor 17). Thus, the collector current flowing through transistor 15 is approximately 0.7 volts divided by the resistance of resistor 18, plus the current flowing into the base terminal of transistor 17. The amount of current flowing into the base terminal of transistor 17 is equal to the amount of collector current flowing through transistor 17 divided by the D.C. current gain of the transistor.

The collector current flowing through transistor 15 provides sufficient base-emitter voltage across resistor 18 for driving transistor 17. Resistor 16 has sufficiently small resistance (3k ohms in the successful prototype) in order to provide sufficient current to the base of transistor 17.

The resistance ratio of resistor 18 to resistor 19 is chosen such that transistor 17 turns off in response to sufficiently small collector current flowing through transistor 15. Specifically, in the event transistor 15 conducts sufficiently small collector current, the base-emitter voltage of transistor 17 drops to below its threshold value. Hence, the ratio of resistances of resistors 16 to 18 establishes the amount of collector current flowing through transistor 15 for which transistor 17 will turn off.

Resistor 19 provides negative feedback from the collector terminal of transistor 17 to the base terminal thereof in order to ensure stability. The ratio of resistances of resistors 19 to 16 establishes the gain from the base terminal of transistor 15 to the ring feed point RF, such that the gain from the output of amplifier 10 to the ring feed point RF of the level shifting circuit 21 is approximately 1.

The output voltage of level shifting circuit 21, appearing on the collector terminal of transistor 17, is thus level shifted to an amplitude for which the output of amplifier 10 (i.e. the input of the level shifting circuit 21) is approximately zero volts (as a result of the non-inverting input thereof being connected to ground).

The relationship between the sensed subscriber's loop current and reference voltage REF, (when the differential amplifier 3 has settled to its quiescent value of zero volts) can be expressed as follows:

$$(R6/R9)*REF=((R6/R4)*I*R1)+((R6/R7)*I*R2),$$

where I is the loop current, and R1, R2, R4, R6, R7 and R9 are the resistances of resistors 1, 2, 4, 6, 7 and 9 respectively. Hence, it can be seen that the subscriber's loop current I can be directly controlled by the reference voltage REF.

In the successful prototype, a constant feed current of approximately 26 mA was generated in response to a reference voltage REF of approximately −11 volts being applied to the non-inverting input of differential amplifier 3.

In the event the ring terminal is short circuited to ground, no current flows through feed resistor 1. Hence, differential amplifier 3 detects a voltage equal to approximately one-half the voltage detected when the telephone set is off-hook. As a result, level shifting circuit 21 attempts to provide additional current in order that the output of differential amplifier 3 should return to its quiescent value of zero volts. Thus, considerable power is dissipated as level shifting circuit 21 attempts to supply additional current to the grounded ring terminal R.

In order to overcome the power dissipation problem associated with the ring terminal R being grounded, differential amplifier 31 senses the current through feed resistor 2, and in the event the sensed current is above a predetermined threshold value, amplifier 31 generates an additional reference voltage for application to the inverting input of differential amplifier 3 in order to decrease the amplitude of the D.C. signal generated therefrom, thereby limiting the current supplied by level shifting circuit 21.

In the successful prototype, resistor 32 and 33 were approximately 400k ohm each, resistor 35 was approximately 2M ohms, and the resulting threshold current value was approximately 33 mA. Hence, in the event the current flowing through feed resistor 2 is greater than approximately 33 mA, differential amplifier 31 generates a negative voltage of approximately −5 volts (the negative supply rail of differential amplifier 31). The approximately −5 volt output is applied to the inverting input of differential amplifier 3 through resistor 34, which in the successful prototype was approximately 470k ohms, such that the output of differential amplifier 3 settles at a slightly positive D.C. quiescent voltage, and the output of differential amplifier 10 settles at a slightly negative D.C. quiescent voltage thereby limiting the current output of level shifting circuit 21 to approximately 36 mA. The current is limited to approximately 36 mA (as opposed to 33 mA) in order that the circuit 21 does not oscillate, as would occur if the current was limited to 33 mA.

Differential amplifier 31 preferably has an open-collector output. Thus, during normal operation, the current flowing through feed resistor 2 is less than the approximately 33 mA threshold and the output of differential amplifier 31 goes to a high impedance state.

Consideration will now be given to operation of the present invention for performing audio signal transmission. Audio signals received from the subscriber's loop and carried by tip and ring terminals T and R, are applied to differential amplifier 3 via input resistors 4 and 5. The audio signals are attenuated by balancing resistors RB1 and RB2 so as to be within the range of voltages defined by power supply rails of differential amplifier 3. The parallel combination of feedback resistor 6 and RB1 is preferably made equal to the parallel combination of resistors RB2, 23 and 9 in order that there be equivalent impedance between the inverting and non-inverting inputs of amplifier 3, to ensure proper longitudinal balance.

The input impedance between the tip and ring terminals T and R should be, and is adjusted to be a standard 600 ohms, as described below.

The A.C. gain of differential amplifier 3 is established by the resistance ratio of feedback resistor 6 to input resistor 4. In the successful prototype, with resistors 1 and 2 being 50 ohms each, feedback resistor 6 being 521k ohms and input resistor 4 being approximately 80k ohms; the A.C. gain of differential amplifier 3 was approximately 0.71 dB.

Signals received from the PABX on the receive audio signal terminal VR are applied to differential amplifier 24, and therefrom to the tip and ring terminals T and R via feed points TF and RF, through resistors 1 and 2.

In particular, the voltage $V_{TF}$ at feed point TF can be represented by the equation:

$$V_{TF} = -R27/R25 * VR,$$

and the voltage $V_{RF}$ at feed point RF can be represented by the equation:

$$V_{RF} = -R20/R30 * VTF,$$

where R27, R25, R20 and R30 are the resistances respectively of resistors 27, 25, 20 and 30. Resistors 20 and 30 are preferably of equal resistance (in the successful prototype, 80k ohms), in order to establish a gain of −1 for A.C. signals, and resistors 25 and 27 were approximately 296k and 80k ohms, respectively.

Signals appearing on the tip feed point TF are thus transmitted via resistor 30 to level shifting circuit 21 and amplified and inverted therein, by a gain of −1. Signals appearing on the VR terminal are thus differentially applied to the tip and ring terminals, T and R.

Hence, with a 600 ohm load across the tip and ring terminals T and R;

$$V_{tip} - V_{ring} = -0.463 * VR, \text{ or}$$

$$(V_{tip} - V_{ring})/VR = -6.68 \text{ dB}$$

As discussed above, the input impedance between the tip and ring terminals should be a standard 600 ohms. In order to achieve an input impedance of 600 ohms using 50 ohm feed resistors 1 and 2, a portion of the signal carried by the tip and ring terminals T and R and received by differential amplifier 3 is fed back in aiding phase to the tip and ring terminals T and R via resistor 29 and differential amplifier 24. By applying a portion of the received signal to the feed points TF and RF, in phase with the received signal, the apparent impedance of feed resistors 1 and 2 is made to appear larger than 50 ohms. In the successful prototype of the invention, resistor 29 was 208k ohms in order to provide an apparent input impedance of 600 ohms.

Signals received from the PABX on the VR terminal and applied to the tip and ring terminals T and R, are required to be cancelled so as not to be received by differential amplifier 3, and applied to the VX terminal. Thus, a portion of the signal received on terminal VR is applied via resistor 23 to the non-inverting input of differential amplifier 3, resulting in cancellation of the inverted received signal applied to the inverting input of amplifier 3 via amplifier 24.

In summary, the line circuit of the present invention utilizes a differential amplifier whose output is regulated to zero volts D.C. (when the subscriber's set is off-hook) by a negative feedback circuit, for controlling a voltage controlled power supply which provides a constant current feed to the subscriber's loop. The differential amplifier also transmits audio signals received from the subscriber's loop directly to a PABX via an unbalanced terminal.

It is an important aspect of the present invention that various components thereof perform multiple functions, resulting in significant economy in quantity of components. For instance, level shifting circuit 21 provides constant D.C. feed current to the loop while simultaneously driving the ring feed point RF with a balanced audio signal received from the tip feed point TF. Differential amplifier 24 transmits audio signals to the tip and ring feed points from the unbalanced receive lead while simultaneously feeding back a portion of the received audio signal from the tip and ring terminals, T and R, to the feed points to provide a matching nominal A.C. impedance of approximately 600 ohms. Differential amplifier 3 transmits A.C. signals received from the subscriber's loop to the PABX via the VX terminal while simultaneously sensing the loop current flowing in the feed resistors 1 and 2 and generating a D.C. voltage for controlling level shifting circuit 21, as well as cancelling signals received from the VR terminal from being applied to the VX terminal.

Since the output voltage of differential amplifier 3 is regulated at zero volts, the received audio signals may be applied directly via the VX terminal to a codec or analog-to-digital converter disposed in the PABX, which would typically malfunction in the event D.C. signals were applied directly thereto, from amplifier 3.

In addition, the feed resistors 1 and 2 of the present invention can be made small in order to provide sufficient loop current from a low voltage (−28 volt) source of battery, yet the input impedance is maintained at a nominal value of 600 ohms by feedback circuitry for applying a portion of the received signal to tip and ring feed points, TF and RF.

Hence, the present invention is an integrated A.C. signal translation circuit and constant current feed circuit, requiring relatively few and inexpensive components.

As discussed above, a portion of the signal carried by the tip and ring terminals T and R and received by differential amplifier 3 is fed back in aiding phase to the tip and ring terminals T and R via resistor 29 and amplifier 24, in order to achieve an input impedance of 600 ohms. Also, a portion of the signal received on the VR terminal is applied via resistor 23 to the non-inverting input of differential amplifier 3, resulting in cancellation of the signal applied to the inverting input of amplifier 3 via amplifier 24. In various European countries a complex input impedance is required to be matched. Hence, resistors 29 and 23 can be replaced by complex feedback networks in the event the line circuit is utilized in such countries.

A person skilled in the art understanding this invention may now conceive of other embodiments or variations thereof.

For instance, transistors 15, 17 and 28 can be eliminated in the event that differential amplifiers 14 and 24 can provide sufficient current and voltage to drive the ring and tip feed points, RF and TF directly.

In addition, differential amplifier 3 can be replaced by two equivalent differential amplifiers in order to increase signal bandwidth.

All such embodiments or variations are considered to be within the sphere and scope of this invention as defined in the claims appended hereto.

We claim:

1. A constant current line circuit for connection to balanced tip and ring leads and unbalanced transmit and receive leads, comprising:
   (a) amplifier means for differentially receiving incoming audio signals carried by said tip and ring leads, sensing D.C. loop current flowing through said tip and ring leads and generating and applying a modulated D.C. signal to said transmit lead in response thereto,
   (b) first means connected via a circuit path to said amplifier means, for filtering and regulating said modulated D.C. signal to a quiescent amplitude of approximately zero volts to produce a D.C. output signal,
   (c) supply means connected via a circuit path to said first means, for receiving said D.C. output signal and applying a constant current D.C. voltage to said tip and ring leads in response thereto, and
   (d) second means for receiving outgoing audio signals carried by said receive lead and differentially applying said outgoing signals to asid tip and ring leads,
   whereby audio signals are bidirectionally translated between said balanced and unbalanced leads, and constant current is simultaneously provided to said balanced tip and ring leads.

2. A constant current line circuit as defined in claim 1, further comprising means connected to said supply means for detecting ground potential on said ring lead and reducing said D.C. voltage applied to said tip and ring leads in response thereto, such that said D.C. loop current is reduced.

3. A constant current line circuit as defined in claim 2, further comprised of:
   (a) feed resistor means having a small resistance value connected in a circuit between said tip and ring leads and said supply means, and to an output of said second means, and
   (b) means connected in a circuit between an output of said amplifier means and an input of said second means for receiving said incoming signals and transmitting reduced versions thereof to the input of said second means,
   whereby said reduced versions of the incoming signals are applied to said feed resistor means in phase with said incoming signals so as to increase resistance to said incoming signals to greater than said small resistance value of said feed resistor means.

4. A constant current line circuit as defined in claim 2 wherein said supply means is comprised of level shifting circuitry for receiving said D.C. output signal from said first means, and in response thereto, varying said constant current voltage, in order to maintain a constant current supply to said tip and ring leads.

5. A constant current line circuit as defined in claim 2 wherein said first means is comprised of a differential amplifier having an inverting input thereof connected via a capacitor to an output thereof and to an output of the amplifier means via an input resistor, a non-inverting input of said differential amplifier being connected to ground, and an output of said differential amplifier being connected to a voltage control input of the supply means.

6. A constant current line circuit as defined in claim 2 wherein said second means for receiving outgoing audio signals is comprised of a differential amplifier having an input connected via a circuit path to said unbalanced receive lead and an output connected via a circuit path to an input of said supply means, for applying said received outgoing signals via said supply means to said tip lead and inverting and applying said outgoing signals to said ring lead via said supply means.

7. A constant current line circuit as defined in claim 2 further including cancelling means for preventing said received outgoing signals from being applied to said unbalanced transmit lead.

8. A constant current line circuit as defined in claim 3 wherein said amplifier means is comprised of means for receiving a predetermined reference voltage and summing voltages across said feed resistor means and comparing said summed voltages with said predetermined reference voltage and generating said modulated D.C. signal in response thereto.

9. A constant current line circuit as defined in claim 3 wherein said supply means is comprised of level shifting circuitry for receiving said D.C. output signal from said first means, and in response thereto varying said constant current voltage, in order to maintain a constant current supply to said tip and ring leads.

10. A constant current line circuit as defined in claim 3 wherein said first means is comprised of a differential amplifier having an inverting input thereof connected via a capacitor to an output thereof and to an output of the amplifier means via an input resistor, a non-inverting input of said differential amplifier being connected to ground, and an output of said differential amplifier being connected to a voltage control input of the supply means.

11. A constant current line circuit as defined in claim 3 wherein said second means for receiving outgoing audio signals is comprised of a differential amplifier having an input connected via a circuit path to said unbalanced receive lead and an output connected via a circuit path to an input of said supply means, for applying said received outgoing signals via said supply means to said tip lead and inverting and applying said outgoing signals to said ring lead via said supply means.

12. A constant current line circuit as defined in claim 3 further including cancelling means for preventing said received outgoing signals from being applied to said unbalanced transmit lead.

13. A constant current line circuit as defined in claim 1 wherein said supply means is comprised of level shifting circuitry for receiving said D.C. output signal from said first means, and in response thereto varying said constant current voltage, in order to maintain a constant current supply to said tip and ring leads.

14. A constant current line circuit as defined in claim 1, wherein said first means is comprised of a differential amplifier having an inverting input thereof connected via a capacitor to an output thereof and to an output of the amplifier means via an input resistor, a non-inverting input of said differential amplifier being connected to ground, and an output of said differential amplifier being connected to a voltage control input of the supply means.

15. A constant current line circuit as defined in claim 1 wherein said second means for receiving outgoing audio signals is comprised of a differential amplifier having an input connected via a circuit path to said unbalanced receive lead and an output connected via a circuit path to an input of said supply means, for applying said received outgoing signals via said supply means to said tip lead and inverting and applying said outgoing signals to said ring lead via said supply means.

16. A constant current line circuit as defined in claim 1 further including cancelling means for preventing said received outgoing signals from being applied to said unbalanced transmit lead.

17. A constant current line circuit for connection to balanced tip and ring leads and unbalanced transmit and receive leads, comprising:
(a) tip and ring terminals for connection to the balanced tip and ring leads,
(b) a first differential amplifier connected to said tip and ring terminals and said unbalanced transmit lead, for translating incoming audio signals carried by said tip and ring terminals to said transmit lead, and sensing D.C. loop current flowing through said tip and ring lead and generating a D.C. signal in response thereto,
(c) an integrator circuit connected to an output of said first differential amplifier, for filtering said incoming audio signals and regulating said D.C. signal to a quiescent amplitude of approximately zero volts to produce a D.C. output signal,
(d) a level shifting circuit connected to an output of said integrator circuit, for receiving said D.C. output signal from said integrator circuit and in response thereto generating and applying said D.C. loop current to said tip and ring terminals,
(e) a second differential amplifier having an input connected to said unbalanced receive lead and an output connected via respective circuit paths to said tip and ring terminals, for receiving outgoing signals carried by said receive lead and differentially applying said outgoing signals to said tip and ring terminals, and
(f) cancelling means for preventing said outgoing signals carried by the receive lead from being applied to said transmit lead,
whereby audio signals are bidirectionally translated between said balanced and unbalanced leads and constant D.C. loop current is simultaneously supplied to said balanced tip and ring leads in response to sensing said D.C. loop current flowing therethrough.

18. A constant current line circuit as defined in claim 17, further comprised of:
(a) a first feed resistor having small resistance value connected between an output of said level shifting circuit and said ring terminal for passing said generated D.C. loop current to the ring terminal,
(b) a second feed resistor having small resistance value connected to said tip terminal for passing said D.C. loop current from said tip terminal to ground, and
(c) means for transmitting a reduced version of said incoming signals from the output of said first differential amplifier to the input of said second differential amplifier so as to be applied to said first and second feed resistors in phase with said incoming signals, thereby increasing the apparent resistance of said first and second feed resistors above said small resistance value.

19. A constant current line circuit as defined in claim 18 further including a third differential amplifier having first and second inputs connected across said first feed resistor through a pair of input resistors, for detecting current flowing through said first feed resistor in excess of a first threshold value indicative of said ring terminal being grounded, and generating a signal for application to said first differential amplifier in response thereto for raising said quiescent amplitude of the D.C. output signal received by said integrator circuit to a positive voltage such that the output D.C. signal regulated by said integrator circuit is lowered and the D.C. loop current supplied to said tip and ring lead is reduced.

20. A constant current line circuit for connection to balanced tip and ring leads and unbalanced transmit and receive leads, comprising:
(a) first means for generating and applying D.C. feed voltage to said balanced tip and ring leads, for causing feed current to flow therethrough,
(b) second means for transmitting incoming audio signals carried by said balanced leads to said unbalanced transmit lead and detecting and comparing said feed current flowing through said balanced tip and ring leads to a predetermined threshold signal and in response generating a D.C. signal,
(c) third means for transmitting outgoing audio signals carried by said unbalanced receive lead to said balanced tip and ring leads, and
(d) fourth means connected to said first and second means for detecting level changes of said D.C. signal and varying said generated feed voltage in response thereto, thereby maintaining said feed current constant,
whereby said audio signals are bidirectionally translated between said balanced and unbalanced leads simultaneously with said constant feed current being provided to the balanced tip and ring leads.

* * * * *